July 20, 1943.  W. T. BORN  2,324,816
SEISMIC SURVEYING
Original Filed May 26, 1933
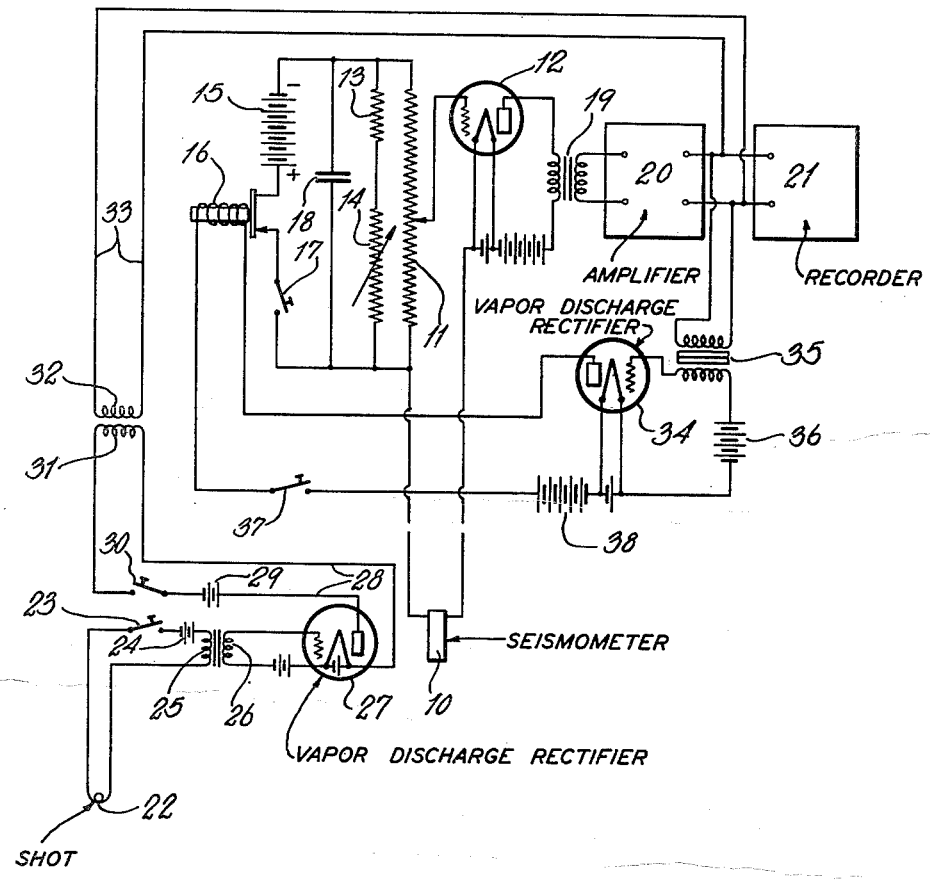
INVENTOR
William T. Born
BY
Kenyon & Kenyon
ATTORNEYS Patented July 20, 1943

2,324,816

UNITED STATES PATENT OFFICE 2,324,816

SEISMIC SURVEYING

William T. Born, Tulsa, Okla., assignor to Geophysical Research Corporation, New York, N. Y., a corporation of New Jersey Original application May 26, 1933, Serial No. 672,996. Divided and this application August 19, 1942, Serial No. 455,331

16 Claims. (Cl. 177—352)

This invention relates to seismic surveying.

In making seismic surveys by the so-called reflection method, a record is made of the earth's disturbance produced at a given point on the earth's surface as the result of the detonation of an explosive charge placed in the earth's surface at a distant point. In general, the record shows waves which have traversed paths close to the earth's surface and waves which have penetrated the earth and have been reflected by interfaces between two layers of different properties or characteristics. In many cases, several interfaces are present at varying depths and the record will show waves reflected from such interfaces. In general, the amplitude of the direct waves or waves traversing a path close to the surface is much greater than the amplitude of the reflected waves and in general, the amplitude of the reflected waves decreases with increase in depth of the interfaces from which they are reflected. Thus, a wave reflected from a shallow interface is received earlier and is of greater amplitude than a wave reflected from a deep interface. If the sensitivity of the recording system and the size of the dynamite charge are so adjusted as to record the reflected waves from a deep interface with the desired amplitude, then the amplitude of reflected waves from shallower interfaces will be too large for satisfactory recording and the amplitude of the direct waves will be so great that the characteristics are not readily observable from the record produced. In general, the amplitude of the various waves received at the recording position is inversely proportional to the distance they have traveled through the earth. While the velocities of the various waves are not generally the same, they are sufficiently alike so that the amplitude of the waves received is roughly in inverse proportion to their travel time from the shot point to the recording position.

In Weatherby, et al. U. S. Patent No. 2,321,341, issued June 8, 1943, of which this patent is a division, there is disclosed and claimed a wave recording system in which the waves reflected from the interfaces of different depths are recorded with approximately the same amplitude and the direct waves are recorded with their amplitude reduced to such extent that their characteristics are readily observable. In such wave recording system, the amplification of the system is automatically increased as a function of time so that the earlier-received waves are amplified less than the later-received waves. The maximum and minimum values of amplification as well as the rate of increase of amplification may be so adjusted that all the received waves are recorded with their amplitudes sufficiently alike to afford satisfactory observation of all the waves. The system of said application is of such design that the increase in amplification of the recording system is initiated at the instant of detonation of the explosive charge. In some cases, it is desirable to have the amplification increase begin at the instant the first direct wave arrives at the recording position rather than to have the amplification increase begin at the time of the shot.

An object of this invention is a modification of the wave recording system above referred to in which the amplification increase is initiated at the time of arrival of the first direct wave at the recording position.

Other objects, novel features and advantages of this invention will become apparent from the following specification and accompanying drawing, wherein the single figure illustrates an embodiment of the invention.

In the drawing, 10 indicates an electrical seismometer preferably of the Galitzen type which is located in the earth at the wave-receiving position. The seismometer 10, together with the variable section of a voltage divider 11 is arranged in the input circuit of a vacuum tube 12 which is provided with the usual output circuit. Two resistances 13 and 14 are connected in series with each other and in parallel with the voltage divider 11 as well as in parallel with a battery 15 through the contacts of a relay 16 and a switch 17. A condenser 18 is also connected in parallel with the voltage divider 11. The output circuit of the vacuum tube 12 is inductively connected by the transformer 19 to the input of an amplifier 20 which is connected in turn to a recorder 21. Alternatively, the tube 12 may constitute the first stage of an amplifier unit.

The operation of the above-described circuit is as follows: When the switch 17 and the contacts of the relay 16 are closed, the battery 15 will charge the condenser 18 and will also cause current to flow through the voltage divider 11 and the resistances 13 and 14. The grid potential of the vacuum tube 12 is thus made negative with respect to the cathode, the absolute value of the grid potential being dependent upon the voltage of the battery 15 and the position of the sliding contact of the voltage divider 11. If then either the switch 17 or the relay 16 contacts are opened, the condenser 18 will discharge through the resistances in parallel with it, the rate of discharge being determined by the capacity of the condenser and the magnitude of the resistances. As the condenser discharges, the negative potential on the vacuum tube grid also decreases and reaches its minimum value when the condenser is completely discharged. As the output of the vacuum tube 12 is dependent upon the value of the grid potential, it will, therefore, vary as the condenser discharges, being at its minimum when the condenser is fully charged and at its maximum when the condenser is fully discharged. The ratio of the maximum to minimum amplification may be adjusted by means of the voltage divider 11 while the rate of discharge of the condenser 18 may be varied by changing the value of the resistance 14. The resistance 13 serves to prevent short-circuiting the battery 15 when the resistance 14 is reduced to zero.

At the shot position, a loop 22 of wire is wrapped around the charge of explosive and is connected in series with a switch 23, a battery 24 and the primary 25 of a transformer. The secondary 26 of the transformer is connected between the control electrode and cathode of a grid-controlled vapor discharge tube rectifier 27 and the output of said rectifier is connected to a transmission line 28, this line having in one side thereof, a battery 29 and a switch 30 and being connected to the primary 31 of a transformer, the secondary 32 of which is connected by a transmission line 33 with the input of the recorder 21.

The winding of the relay 16 is included in the plate circuit of a grid-controlled vapor discharge tube rectifier 34, the grid circuit of which is inductively connected through a transformer 35 to the output of the amplifier 20. A battery 36 provides bias for the grid of tube 34. A switch 37 is included in the output circuit of the rectifier 34 and a battery 38 provides the plate voltage therefor.

The adjustment of the rectifier tube 34 is such that normally no current flows in its plate circuit. The grid bias of the rectifier is adjusted to a value slightly below that required to cause an arc to strike between the cathode and the plate.

In the operation of the system above described for producing a wave record, the switch 17 is closed with the relay 16 contacts and the switch 37 closed to complete the output circuit of the rectifier 34 through the winding of the relay 16 and the switches 23 and 30 likewise are closed with the potential of the grid of the rectifier 27 so adjusted that no current flows in the plate circuit. The explosive charge is then detonated, thereby breaking the loop 22 and causing the cessation of current flowing from the battery 24 through the transformer primary 25. This produces a voltage surge in the transformer secondary 26 which surge excites the rectifier 27 and causes current to flow in the line 28. A flow of current is produced in the line 33 through the intermediary of the transformer primary 31 and secondary 32, thereby causing the recorder 21 to make an indication of the time of firing the shot. This time-break impulse is of insufficient magnitude to strike an arc between the filament and plate of the rectifier 34 due to the adjustment of the biasing battery 36 of said rectifier. The arrival of the first direct wave at the seismometer 10 produces an impulse in the amplifier 20 output which effects a sufficient increase in the voltage applied to the grid of the rectifier 34 to cause an arc to strike between the filament and plate thereof with consequent current flow in its plate circuit. Such current flow energizes the relay 16, thereby actuating the movable contact thereof to open circuit the battery and permit the condenser 18 to discharge as previously described, thus effecting progressive amplification of the received waves.

After the desired waves have been received and recorded, the switch 37 is opened to de-energize the relay 16 and permit its contacts to close. Also, the various other switches are opened preparatory to conditioning the system for its next use.

It is of course understood that modifications may be made in the apparatus above described without in any way departing from the spirit of the invention as defined in the appended claims.

I claim:

1. Apparatus for seismic surveying comprising a seismometer for converting seismic waves into electrical waves, an amplifier for said electrical waves, a recorder for said amplified electrical waves, and means actuated by the arrival of said seismic waves at said seismometer for increasing the degree of amplification of said electrical waves.

2. Apparatus for seismic surveying comprising a seismometer for converting seismic waves into electrical waves, an amplifier for said electrical waves, a recorder for said amplified electrical waves, and means actuated by the arrival of said seismic waves at said seismometer for increasing the recorder response.

3. Apparatus for seismic surveying comprising a seismometer for converting seismic waves into electrical waves, an amplifier for said electrical waves, a recorder for said amplified electrical waves, normally inoperative means for increasing the degree of amplification of said electrical waves, a switch for rendering operative said means, a lock-in relay connected to the output of said amplifier, and means responsive to the actuation of said lock-in relay for actuating said switch.

4. Apparatus for seismic surveying comprising a seismometer for converting seismic waves into electrical waves, an amplifier for said electrical waves, a recorder for said amplified electrical waves, normally inoperative means for increasing the degree of amplification of said electrical waves, a switch for rendering operative said means, a grid-controlled vapor discharge tube rectifier, means connecting the input of said vapor discharge tube rectifier to the output of said amplifier, and means responsive to variation in the output of said rectifier for actuating said switch.

5. Apparatus for seismic surveying comprising a seismometer for converting seismic waves into electrical waves, an amplifier for said electrical waves, a recorder for said amplified electrical waves, normally inoperative means for increasing the response of said recorder, a switch for rendering operative said means, a lock-in relay connected to the output of said amplifier, and means responsive to the actuation of said lock-in relay for actuating said switch.

6. Apparatus for seismic surveying comprising a seismometer for converting seismic waves into electrical waves, an amplifier for said electrical waves, a recorder for said amplified electrical waves, normally inoperative means for increasing the response of said recorder, a switch for rendering operative said means, a grid-controlled vapor discharge tube rectifier, means connecting the input of said vapor discharge tube rectifier to the output of said amplifier, and means responsive to variation in the output of said rectifier for actuating said switch.

7. Apparatus for seismic surveying comprising means for converting seismic waves into electrical waves, a variable response recorder for said electrical waves, and means actuated by the arrival of seismic waves at said converting means for increasing the recorder response.

8. Apparatus for seismic surveying comprising means for converting seismic waves into electrical waves, a variable response recorder for said electrical waves, normally inoperative means for increasing the response of said recorder, a switch for rendering operative said means, a lock-in relay connected to the output of said converting means, and means responsive to the actuation of said lock-in relay for actuating said switch.

9. Apparatus for seismic surveying comprising means for converting seismic waves into electrical waves, a variable response recorder for said electrical waves, normally inoperative means for increasing the response of said recorder, a switch for rendering operative said means, a grid controlled vapor discharge tube rectifier, means connecting the input of said vapor discharge tube rectifier to the output of said converting means, and means responsive to variation in the output of said rectifier for actuating said switch.

10. A system for recording artificial seismic waves of varying amplitude on a record strip of limited uniform width comprising a vacuum tube amplifier having a cathode and a control electrode, an electrical seismometer, means for impressing the output voltage of said seismometer between said cathode and control electrode, means for applying negative voltage to said control electrode, means effective at the instant of first wave reception for progressively decreasing the negative voltage applied to said control electrode during substantially the entire period of reception of the seismic waves, a recorder, and connections for impressing the output of said amplifier upon said recorder.

11. Seismic prospecting apparatus comprising means for receiving seismic waves the amplitudes of which decrease as a function of time and converting said waves into electrical pulsations of corresponding amplitudes, a recorder connected to said means adapted to receive said electrical pulsations and respond thereto in proportion to their amplitudes, controlling means connected to said recorder for increasing the responsiveness thereof to said pulsations as the magnitude of the latter decrease, and means associated with said receiving means and said controlling means for setting said controlling means into operation at the beginning of the electrical pulsations.

12. Electronic apparatus of the character described adapted to maintain a substantially constant output when the mean signal input thereto varies substantially unidirectionally through a wide range during an interval of time, including: an amplifier having a gain variable through a range substantially equivalent to that of said input variation; means for automatically varying said gain through its range in said interval, said means varying said gain inversely to said input variation and, at least as to a portion of the variation of said gain, independently of said signal; and means for rendering said automatically varying means operable substantially simultaneously with initiation of said input variation.

13. An electronic amplifier of the character described adapted to maintain a substantially constant output when the mean signal input thereto varies substantially unidirectionally through a wide range during a short interval of time, including: amplifying means including at least one vacuum tube having a variable amplification factor; a source adapted to supply a bias voltage; means for impressing said bias voltage on an element of said tube to control the amplification thereof; and means for automatically varying said voltage always through a predetermined range during said interval, said means for automatically varying the voltage comprising a condenser and a resistor through which it is adapted to discharge in said interval, means for charging said condenser to the desired initial voltage and means initiating discharge of said condenser upon initiation of said signal input variation, said voltage variation being such as to effect a variation in said amplification factor inverse to the variation of the signal input.

14. An electronic amplifier of the character described adapted to maintain a substantially constant output when the mean signal input thereto varies substantially unidirectionally through a wide range during a short interval of time, including: amplifying means including at least one vacuum tube having a variable amplification factor; a condenser adapted to have a bias voltage thereacross, means for impressing said bias voltage on an element of said tube to control the amplification thereof; means for maintaining the voltage across said condenser at a desired initial value; a discharge circuit for said condenser, said circuit including a resistor of such a value that the discharge time of said condenser is substantially the same as said interval; and means rendering said voltage maintaining means inoperative upon initiation of said signal input variation.

15. A method of seismic surveying which comprises receiving artificial seismic waves reflected from a plurality of sub-surface geological strata of varying depths, converting the received seismic waves into electrical waves, amplifying and recording said electrical waves, initiating an amplification increase at a time subsequent to the time of generation of said seismic waves, and gradually and continuously increasing the amplification of said electrical waves in a selected definite predetermined time relation, beginning at the time of said initiation and extending over the time interval during which seismic waves reflected from said plurality of sub-surface geological strata of varying depths and compositions are being received.

16. The method of seismic surveying which comprises receiving artificial seismic waves, converting received seismic waves into electrical waves, amplifying and recording said electrical waves, initiating amplification increase at the time of receipt of the first seismic wave and gradually and continuously increasing the amplification of said electrical waves in a selected definite predetermined time relation beginning at the time of said initiation and extending over the time interval during which seismic waves reflected from one or more sub-surface geological strata are being received.

WILLIAM T. BORN.